(12) United States Patent  (10) Patent No.: US 9,260,937 B2
Chauveteau et al.  (45) Date of Patent: Feb. 16, 2016

(54) FLOW RATE CONTROL VALVE FOR SOLUTIONS OF POLYMERS

(75) Inventors: Guy Chauveteau, Vigoulet Auzil (FR); Stéphane Jouenne, Bizanos (FR)

(73) Assignee: TOTAL S.A., Courbevoie (FR)

( * ) Notice: Subject to any disclaimer, the term of this patent is extended or adjusted under 35 U.S.C. 154(b) by 415 days.

(21) Appl. No.: 13/807,990

(22) PCT Filed: Jul. 1, 2011

(86) PCT No.: PCT/IB2011/052930
§ 371 (c)(1),
(2), (4) Date: Jan. 2, 2013

(87) PCT Pub. No.: WO2012/001671
PCT Pub. Date: Jan. 5, 2012

(65) Prior Publication Data
US 2013/0098620 A1  Apr. 25, 2013

(30) Foreign Application Priority Data
Jul. 2, 2010 (FR) ........................... 10 55338

(51) Int. Cl.
*E21B 34/06* (2006.01)
*E21B 34/14* (2006.01)
*E21B 43/20* (2006.01)
*F16K 47/08* (2006.01)

(52) U.S. Cl.
CPC .............. *E21B 34/06* (2013.01); *E21B 34/14* (2013.01); *E21B 43/20* (2013.01); *F16K 47/08* (2013.01); *Y10T 137/86815* (2015.04)

(58) Field of Classification Search
CPC ......... E21B 37/06; E21B 34/00; E21B 43/20; E21B 43/16; F16K 47/08; F16K 3/34; F16L 9/19; F16L 9/20; F15D 1/02
See application file for complete search history.

(56) References Cited

U.S. PATENT DOCUMENTS

| 3,170,483 | A |   | 2/1965 | Milroy |
| 3,250,469 | A | * | 5/1966 | Colston ................... 235/200 PF |
| 3,477,467 | A |   | 11/1969 | Sewell et al. |
| 3,838,598 | A | * | 10/1974 | Tompkins .................. 73/861.52 |
| 4,276,904 | A | * | 7/1981 | Jackson ................... 137/599.01 |
| 4,510,993 | A |   | 4/1985 | Luetzelschwab |
| 4,617,991 | A |   | 10/1986 | Luetzelschwab |
| 4,782,847 | A | * | 11/1988 | Luetzelschwab ............... 137/13 |
| 5,255,716 | A | * | 10/1993 | Wilcox .......................... 138/44 |
| 5,307,830 | A |   | 5/1994 | Welker |
| 5,392,815 | A | * | 2/1995 | Stuart ............................ 138/37 |
| 5,730,416 | A |   | 3/1998 | Welker |
| 6,228,146 | B1 |  | 5/2001 | Kuespert |
| 7,276,904 | B2 |  | 10/2007 | Busse et al. |

(Continued)

*Primary Examiner* — Jennifer H Gay
(74) *Attorney, Agent, or Firm* — Harness, Dickey & Pierce, P.L.C.

(57) ABSTRACT

A flow rate control valve and a method for injecting a fluid into an underground formation are provided. In accordance with the method, the fluid is transported in at least one injection pipe. The injection pipe has a main portion including a single tube. The flow rate control valve has at least ten fluid transport tubes that are arranged in parallel. A ratio of the cross-section of the main portion over the sum of the cross-sections of the fluid transport tubes is less than or equal to 5. A flow rate of the fluid circulating in the injection pipe is adjusted by distributing the fluid through all or only some of the fluid transport tubes. The fluid from the injection pipe is then injected into the underground formation.

18 Claims, 4 Drawing Sheets

(56) References Cited

U.S. PATENT DOCUMENTS

| | | | |
|---|---|---|---|
| 7,845,688 B2* | 12/2010 | Gallagher et al. | 285/412 |
| 7,942,206 B2 | 5/2011 | Huang et al. | |
| 2008/0041580 A1 | 2/2008 | Freyer et al. | |
| 2008/0246277 A1* | 10/2008 | Gallagher et al. | 285/148.13 |
| 2009/0184277 A1 | 7/2009 | Song | |
| 2011/0240289 A1* | 10/2011 | Pich | 166/270.1 |
| 2011/0297399 A1* | 12/2011 | Dyck | 166/386 |
| 2012/0292026 A1* | 11/2012 | Brooks | 166/270.1 |
| 2013/0098620 A1* | 4/2013 | Chauveteau et al. | 166/305.1 |
| 2014/0109997 A1* | 4/2014 | McHugh | 137/505 |

* cited by examiner

FLOW RATE CONTROL VALVE FOR SOLUTIONS OF POLYMERS

CROSS-REFERENCE TO RELATED APPLICATIONS

This application is a National Phase Entry of International Application No. PCT/IB2011/052930, filed on Jul. 1, 2011, which claims priority to French Patent Application Serial No. 1055338, filed on Jul. 2, 2010, both of which are incorporated by reference herein.

FIELD OF THE INVENTION

The present invention relates to a flow rate control valve adapted for the transport of fluids such as solutions of polymers, as well as to a method for injecting fluid notably in an underground formation as well as to a transport installation notably for injecting fluid, for example in an underground formation using said flow rate control valve.

BACKGROUND

The use of solutions of polymer notably of polyacrylamide is known within the scope of assisted recovery of hydrocarbons contained in an underground formation (EOR, Enhanced Oil Recovery). Thus, after the operations for recovering hydrocarbons by means of the natural pressure of the deposit, a so-called "primary" deposit, it is generally preceded with a so-called "secondary" recovery of hydrocarbons, during which a solution of polymer is injected into the underground formation through injection well(s), and a mixture of hydrocarbons and of polymer solution is extracted from production well(s). The use of a polymer solution and not of water is preferred because of the often too great mobility of water: the flooding efficiency is improved by adding polymer to the injection water, as well as the production conditions (reduced percentage of produced water). A larger recovery rate is thereby obtained from the moment when it is decided to stop production (because of a too high percentage of produced water).

When several injection wells are used, it is generally necessary to operate at different pressures depending on the wells, in order to adapt to the local configuration of the underground formation, and to correct the heterogeneity effects of said underground formation. Now, several injection wells (or all the injection wells) are generally supplied with fluid by a same source of polymer solution. It is therefore necessary to have flow rate control valves for each injection well, notably within the scope of marine exploitation (offshore), where it would be too complex or too expensive to provide a supply line and one pump per injection well.

Among the flow rate control valves available for the above application, the company Cameron Willis proposes a model which consists in a cage pierced with holes. The inflow for the fluid is achieved on the periphery of the cage, and the outflow is at the centre of the cage. The accessible surface area for the fluid inflow is adjusted by a mobile piston which moves parallel to the axis of the cage. For a given flow rate, the pressure loss increases when the surface area accessible to the inflow of the fluid decreases. However, this system leads to a strong degradation of the polymer solutions used for assisted recovery of hydrocarbons, and therefore to a decrease in the viscosity of these solutions, which is strongly detrimental to their efficiency.

Moreover, U.S. Pat. No. 4,510,993 describes a flow rate control valve for polymer solutions, in which the flow rate is regulated by a needle penetrating into an orifice. The document indicates that the polymers are not degraded as long as the flow rate does not exceed 30 gallons/min, i.e. 7 $m^3/h$. However, it is known that such a geometry (of the needle valve type) is degrading. Thus, the degradation of the polymer solutions in this type of system becomes high at more realistic flow rates of the order of 100 $m^3/h$. Further such a system has significant risks of mechanical wear.

U.S. Pat. No. 3,477,467 describes a suitable flow rate control valve for a polymer solution, in which the pressure loss is obtained by having the polymer solution pass in a vertical tube filled with sands or beads. The adjustment of the amount of sand or beads allows regulation of the flow rate. However, this system also has the drawback of degrading the polymer solutions, and it also has significant risks of mechanical wear of the valve and of damage to the porous medium over time. Further, implementation is difficult.

U.S. Pat. No. 4,617,991 proposes a flow rate control system comprising a device actuated by the transport of a polymer solution, such as a hydraulic pump or a motor. This type of device is adapted for recovering the energy from the flow of the polymer solution. With the system, it is possible to avoid degradation of a polymer solution at a low flow rate (at most about 1.3 $m^3/h$). However, it does not give the possibility of avoiding the degradation phenomenon at a higher flow rate. Actually, although the energy is dissipated outside rather than inside the pipe, the degradation remains a function of the geometry of the dissipation system inside the pipe.

U.S. Pat. No. 4,276,904 describes an apparatus with which a fluid flow rate may be modified by having the fluid pass into a limited number of tubes of different lengths and of different diameters. The pressure loss is adjusted by having the fluid pass in one of the combinations among the different tubes. This system is bulky, difficult to apply (the apparatus notably comprises a large number of valves, which have to be activated independently, at the outlet of each of the tubes) and not very flexible (i.e., with it, fine adjustment of the pressure loss and of the flow rate is possible only with difficulty). Such a system does not give the possibility of generating a sufficient pressure loss at a high flow rate.

Therefore, there exists a real need for development of a flow rate control valve adapted for the injection of polymer solutions in an underground formation which does not have the drawbacks mentioned above. In particular, a need exists for developing a flow rate control valve which does not induce any significant degradation of the solutions of polymer used within the scope of assisted recovery of hydrocarbons, even at a high flow rate.

SUMMARY

The invention firstly relates to a method for injecting a fluid in an underground formation, wherein:
  a fluid is transported in at least one injection pipe;
  the injection pipe comprises a main portion including a single tube having a cross-section, and a flow rate control valve including at least ten (preferably at least one hundred) fluid transport tubes arranged in parallel and having a plurality of cross-sections: and wherein the ratio of the cross-section of the single tube of the main portion over the sum of the plurality of cross-sections of the fluid transport tubes of the flow rate control valve is less than or equal to 5, preferably less than or equal to 3 and more preferably less than or equal to 1.5,
  the flow rate of the fluid circulating in the injection pipe is adjusted by distributing the fluid in all or part of the fluid transport tubes of the flow rate control valve;

the fluid from the injection pipe is injected into the underground formation.

According to one embodiment:

the plurality of cross-sections of at least one portion of the fluid transport tubes is at least ten times smaller than the cross-section of the single tube of the main portion, preferably at least one hundred times smaller, more preferably at least one thousand times smaller and preferably at least ten thousand times smaller; and/or the cross-section of each of the transport tubes being constant over a length of each of the fluid transport tubes, and/or the transport tubes are cylinders and each of the cylinders extends along a longitudinal axis and/or the longitudinal axes of the cylinders are parallel to each other, and/or the plurality of cross-sections of the fluid transport tubes are circular.

According to an embodiment, the adjustment of the fluid flow rate in the injection pipe is carried out by selectively obturating all or part of the fluid transport tubes. According to an embodiment, the fluid is distributed in a plurality of injection pipes by pumping means, each injection pipe comprising a main portion including a single tube and a flow rate control valve including at least ten (preferably at least one hundred) fluid transport tubes arranged in parallel, the flow rate of the fluids circulating in each injection pipe being adjusted by distributing the fluid in all or part of the fluid transport tubes, and the fluid from the injection pipes being injected into the underground formation. According to an embodiment, the fluid transport tubes do not all have identical cross-sections, and are preferably arranged per groups of fluid transport tubes with essentially identical cross-sections.

According to an embodiment:

the plurality of cross-sections of at least one portion of the fluid transport tubes ranges from 0.012 to 100 $mm^2$, preferably from 0.05 to 50 $mm^2$, and more preferably from 0.8 to 30 $mm^2$; and/or the cross-section of at least one fluid transport tubes ranges from 1 to 100 $cm^2$, preferably from 1 to 50 $cm^2$; and/or the totality of the fluid transport tubes have a length ranging from 1 cm to 10 m, preferably from 10 cm to 3 m, and more preferably from 30 cm to 1.5 m.

According to an embodiment, the fluid is an aqueous solution of a polymer, the molecular mass of the polymer is larger than $10^6$ Da. According to an embodiment, the fluid is an aqueous solution of polymer, preferably an aqueous solution of polyacrylamide. According to an embodiment, the fluid is an emulsion, preferably an oil/water emulsion. According to an embodiment, the method described above comprises a step for recovering hydrocarbons from the underground formation and optionally for treating the recovered hydrocarbons.

The object of the invention is also a flow rate control valve intended to be connected to a single tube of a pipe having a cross-section, the valve comprising:

at least ten (preferably at least one hundred) fluid transport tubes arranged in parallel and having a plurality of cross-sections;

means for connecting to a main portion of the single tube of the pipe, located at one end of the fluid transport tubes, and where the ratio of the cross-section of the single tube of the main portion over the sum of the plurality of cross-sections of the fluid transport tubes of the flow rate control valve is less than or equal to 5, preferably less than or equal to 3, and more preferably less than or equal to 1.5.

According to an embodiment, the flow rate control valve comprises means for obturating at least one portion of the fluid transport tubes. According to an embodiment, the obturation means comprise a diaphragm, fins, a sleeve valve or a piston. According to one embodiment, the fluid transport tubes do not all have identical cross-sections and are preferably arranged per groups of fluid transport tubes with essentially identical cross-sections.

According to an embodiment:

the plurality of cross-sections of at least one portion of the fluid transport tubes range from 0.012 to 100 $mm^2$, preferably from 0.05 to 50 $mm^2$, and more preferably from 0.8 to 30 $mm^2$; and/or the cross-section of at least one fluid transport tube ranges from 1 to 100 $cm^2$, preferably from 1 to 50 $cm^2$; and/or the totality of the fluid transport tubes has a length ranging from 1 cm to 10 m, preferably from 10 cm to 3 m, and more preferably from 30 cm to 1.5 m.

The invention also relates to a transport installation, notably for injecting a fluid, for example into an underground formation, comprising at least one pipe notably for injection, the pipe comprising:

a main portion which includes a single tube having a cross-section, and a flow rate control valve as described above, connected to the single tube of the main portion through connecting means.

According to an embodiment of this installation:

the flow rate control valve including at least ten fluid transport tubes having a plurality of cross-sections;

the plurality of cross-sections of at least one portion of the fluid transport tubes being at least ten times smaller than the cross-section of the single tube of the main portion, preferably at least one hundred times smaller, more preferably at least one thousand times smaller and preferably at least ten thousand times smaller; and/or each transport tube is of constant cross-section over its length; and/or the transport tubes are cylinders and each cylinder extends along a longitudinal axis and/or the longitudinal axes of the cylinders are parallel to each other, and/or the plurality of cross-sections of the fluid transport tubes are circular.

According to an embodiment, the installation comprises a plurality of injection pipes, notably connected to pumping means, each pipe notably for injection comprises a main portion including a single tube and a flow rate control valve as described above. By single fluid-supplying tube is meant according to the present invention, the main portion of a single tube of a pipe. The pipe may be a fluid transport pipe, a pipe for pumping a fluid. Preferably, the pipe is a pipe for injecting a fluid.

With the present invention, it is possible to overcome the drawbacks of the state of the art. More particularly it provides a flow rate control valve which does not induce any significant degradation of the polymer solutions used within the scope of assisted recovery of hydrocarbons, even at a high flow rate.

This is accomplished by using a bundle including a large number of fluid transport tubes (also called capillaries in the following) arranged in parallel. In the system according to the invention, the pressure losses are essentially generated by friction of the conveyed fluid on the walls of the capillaries, and not upon flowing through geometrical contractions. In particular, the effective contraction ratio in the system (i.e. the ratio between the useful section for the fluid upstream from the inlet of the capillaries and the useful section for the fluid in the capillaries) is small. Thus, the elongational velocity gradient remains moderate in the whole of the system (unlike most devices of the state of the art), it only allows little or quasi no degradation of the polymers, even at a high flow rate.

According to certain particular embodiments, the invention also has one or preferably several of the advantageous characteristics listed below.

Because the solutions of polymer are not very degraded by means of the invention, substantial savings may be obtained in terms of the total amount of polymer to be used for mobilizing the hydrocarbons from an underground formation.

When the flow rate control valve according to the invention comprises means for obturating the capillaries, it is possible to adjust as needed and practically continuously the pressure loss and the flow rate in the valve by obturating a more or less large number of capillaries and/or by selectively obturating the capillaries having a given size. This system is simpler to apply than the one of U.S. Pat. No. 4,276,904, wherein the adjustment of the flow rate and of the pressure loss is carried out by actuating a large number of distinct closing devices via valves.

The use of capillaries of different diameters in a same flow rate control valve allows regulation of the pressure drop and of the flow rate in the valve in a larger range of values than when all the capillaries are identical.

The flow rate control valve according to the invention is robust and may have relatively small dimensions, well adapted for incorporation into conventional networks for distributing fluid to underground formations.

DETAILED DESCRIPTION

Figure 1:
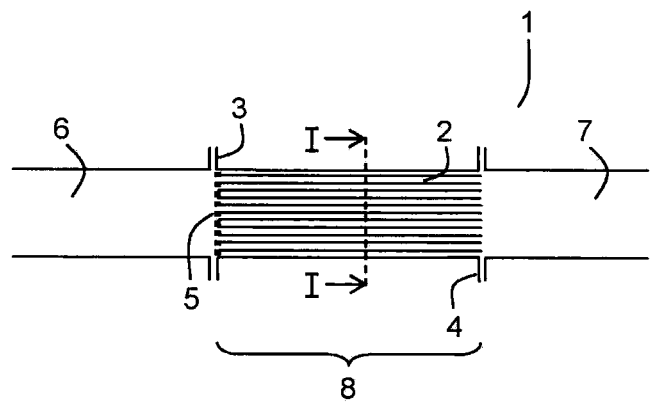
FIG. 1 schematically illustrates an embodiment of a flow rate control valve according to the invention, integrated to an injection pipe.

The invention is now described in more detail and in a non limiting way in the following description. With reference to FIG. 1, a transport pipe notably for injection 1, intended to inject a fluid for example in an underground formation, comprises at least one main portion 6 including a single tube, and a flow rate control valve 8 connected to the main portion 6 through connecting means 3, for example, a connecting flange.

The main portion 6 of the pipe is connected at its other end to fluid supply means (not shown). Generally, these supply means include a tank of fluid and pumping means. In principle, a plurality of injection pipes is connected to a single tank of fluid and to single pumping means. The pumping means are adapted so as to cause the pressurized fluid to circulate in the injection pipe, successively in the single tube of the main portion 6 of each pipe, and then through the flow rate control valve 8.

The fluid used is preferably a solution of polymer, notably a solution of hydrophilic polymer with a large molecular mass, for example the molecular mass of the polymer is greater than $10^6$ Da (dalton; 1 Da=1 g/mol). Preferably, the molecular mass of the polymer is comprised between $1.5*10^6$ Da and $50*10^6$ Da, more preferably between $8*10^6$ Da and $35*10^6$ Da. More preferably, the polymer solution is a solution of polyacrylamide. Polyacrylamide, not very sensitive to biodegradation and less expensive than biopolymers is very widely used but is particularly sensitive to mechanical degradation, since it is a relatively flexible polymer which adopts a ball configuration which is stretched when it is located in a strong elongational flow (for example, a contraction) which leads to the breaking of the carbon-carbon bond. The invention may also be applied with other types of fluids, notably fluids capable of mechanical degradation, and for example emulsions, notably oil/water emulsions.

According to an embodiment (not shown) the end of the injection pipe 1, located opposite to the fluid supply means (i.e. the end of the injection pipe 1 through which the fluid flows out and is released into the underground formation) is directly formed by the flow rate control valve 8. According to this embodiment, the fluid is directly injected into the underground formation upon flowing out of the flow rate control valve 8.

However, according to another (preferred) embodiment, the end of the flow rate control valve 8, located opposite to the main portion 6 of the injection pipe 1, is connected to a second main portion 7 including a single tube, via connecting means 4, for example a connecting flange. The fluid therefore circulates in the tube of the main portion 6, and then through the flow rate control valve 8, and then in the tube of the second main portion 7, before being injected into the underground formation. With this configuration, it is possible to provide specific means at the end of the injection pipe 1 adapted for optimally distributing the fluid in the underground formation on the one hand and for simplifying the actuation and optional maintenance of the flow rate control valve 8 on the other hand, as compared with the case in which the latter is located at the end of the injection pipe 1, i.e. necessarily in depth before penetrating into the underground formation.

The flow rate control valve 8 includes a plurality of fluid transport tubes 2 arranged in parallel in the direction of flow. Within the scope of the present application, this term "in parallel" means that the fluid transport tubes 2 are arranged so that the fluid from the single tube of the main portion 6 may (in the absence of obturation) be distributed into the totality of the fluid transport tubes 2. In other words, the total fluid flow rate in the injection pipe 1 is the sum of the individual fluid flow rates in the different fluid transport tubes 2, each of these individual flow rates being non-zero (except for obturation of a portion of the fluid transport tubes 2). The term "in parallel" does not necessarily imply that the axes of the fluid transport tubes 2 are parallel to each other in the geometrical sense, although such a situation is possible, and even preferable for reasons of simplicity of design. The tubes for example may be wound in parallel.

The fluid transport tubes 2 may be parallel slots made in one or several blocks of material. According to the invention, the number of fluid transport tubes 2 is greater than or equal to 10, preferably greater than or equal to 100, or greater than or equal to 200, or greater than or equal to 500, or greater than or equal to 1,000, or greater than or equal to 1,500, or greater than or equal to 2,000, or greater than or equal to 5,000. Indeed, the presence of a large number of fluid transport tubes 2 allows generation of a significant pressure loss with a minimum of degradation of the fluid for a given flow rate.

Figure 2:
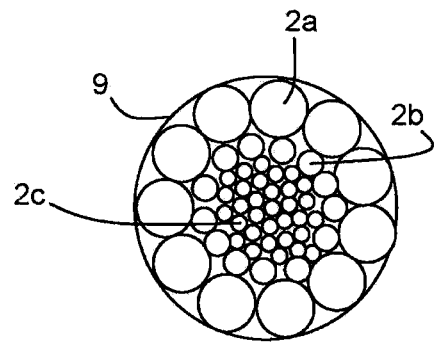
FIG. 2 corresponds to a cross-section taken along line I-I of the flow rate control valve of FIG. 1.
Figure 3:
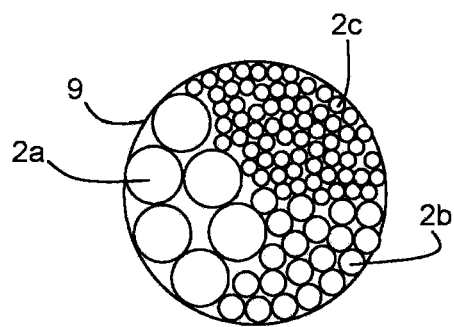
FIG. 3 corresponds to a cross-section taken along line I-I of the flow rate control valve of FIG. 1, according to another embodiment.

Referring to FIGS. 2 and 3, the fluid transport tubes 2 are grouped into a bundle, which may be contained in a sheath 9. For reasons of simplicity, it may be provided that the sheath 9 has the same shape as the main portion 6 and the second main portion 7 of the pipe. The sheath 9 is advantageously of a cylindrical shape with a circular base but may also have another shape (for example a cylindrical shape with a square base). The main portion 6 has a cross-section and the fluid transport tubes 2 may themselves have a plurality of cross-sections of circular shape or of another shape (for example a square shape).

Within the scope of the present application, by "cross-section" of a tube is meant the surface of the internal space of the tube which is perpendicular to the main axis of the tube, i.e. perpendicular to the average direction of flow of the fluid. Generally, each tube has a constant cross-section along its axis. If however this cross-section varies along the axis, the minimum value of the cross-section will be retained for defining the term.

The plurality of cross-sections of at least one portion of the fluid transport tubes 2 are at least 10 times smaller than cross-section of the single tube of the main portion 6 (and than cross-the section of the single tube of the second main portion 7), preferably at least 100 times smaller, more preferably at least 1,000 times smaller and preferably at least 10,000 times smaller. When there are a large number of fluid transport tubes 2, the plurality of cross-sections are small relative to the cross-section of the tube of the main portion 6, allowing the generation of a significant pressure loss with a minimum of degradation of the fluid, for a given flow rate.

For example, the plurality of cross-sections of at least one portion of the fluid transport tubes 2 may range from 0.012 to 100 mm$^2$, preferably from 0.05 to 50 mm$^2$, and more preferably from 0.8 to 30 mm$^2$. Still as an example, for fluid transport tubes 2 with a circular cylindrical shape, the internal diameter is from 0.125 to 11 mm, preferably from 0.25 to 8 mm, and more preferably from 1 to 6 mm; for a main portion 6 with a circular cylindrical shape, the internal diameter is preferably from 1 to 30 cm.

The flow rate control valve 8 may be without any obturation means. In this case, the fluid always circulates in the totality of the fluid transport tubes 2 and the generated pressure loss cannot be adjusted by the operator independently of the flow rate.

However, provision should preferably be made for means 5 for obturating the fluid transport tubes 2, which may be remotely actuated (for example by hydraulic control or by electric control). Preferably, these obturation means 5 are arranged at the inlet of the fluid transport tubes 2 (i.e. they are located at the interface between the main portion 6 of the pipe and the fluid transport tubes 2) or optionally at the outlet of the fluid transport tubes 2 (i.e. at the interface between the second main portion 7 of the pipe and the fluid transport tubes 2). For reasons of simplicity, it is preferred that the obturation means 5 comprise a single mobile portion or else an assembly of mobile portions which co-operate together (for example a plate, a set of permanently attached fins, a piston, a diaphragm or other means) and not several mobile portions which have to be actuated independently of each other.

All the fluid transport tubes 2 may be of identical shape and cross-section. However, it is preferred that the fluid transport tubes 2 do not all have identical cross-sections. In particular it is useful to provide fluid transport tubes 2 of relatively large size, in addition to the fluid transport tubes 2 of small size described above. By having the fluid pass into the fluid transport tubes 2 of larger size, the pressure loss is reduced for a given flow rate.

For example, it may be provided that the whole of the fluid transport tubes 2 be distributed in two different sizes (or two sections) or in three or more different sizes (or three sections). Three sizes are provided in the embodiment of FIGS. 2 and 3, i.e. the fluid transport tubes 2 are distributed in large tubes 2a, medium tubes 2b and small tubes 2c. As an example, the tubes of larger size (notably the large tubes 2a in the embodiment of FIGS. 2 and 3) advantageously have cross-sections ranging from 1 to 100 cm$^2$, preferably from 1 to 50 cm$^2$.

Thus, selective obturation of the fluid transport tubes 2 of large size allows generation of a significant pressure loss by forcing the liquid to pass into the fluid transport tubes 2 of small size. And the aperture of the fluid transport tubes 2 of large size (either associated or not with the obturation of the fluid transport tubes 2 of small size) allows strong reduction in the pressure loss by allowing the fluid to pass into the fluid transport tubes 2 of small size. The configuration of the obturation means 5 is therefore advantageously adapted to the arrangement of the fluid transport tubes 2. The fluid transport tubes 2 are advantageously grouped according to their size (or cross-section), in order to facilitate selective obturation of the fluid transport tubes 2 depending on their size.

Thus, in the case illustrated in FIG. 2, the small tubes 2c are arranged in the center, the medium tubes 2b around the small tubes 2c and the large tubes 2a around the medium tubes 2b, i.e. at the periphery. With this configuration, it is possible to selectively obturate the tubes easily by using the obturation means formed by a diaphragm.

In the case illustrated in FIG. 3, the small tubes 2c, the medium tubes 2b and the large tubes 2a are distributed as disk sectors. With this configuration it is possible to selectively obturate the tubes easily by using obturation means including fins. According to another configuration not shown, still with a sheath 9 of a circular cylindrical shape, the tubes are distributed as crescents, which allows easy selective obturation of the tubes by using a sleeve valve.

Figure 4:
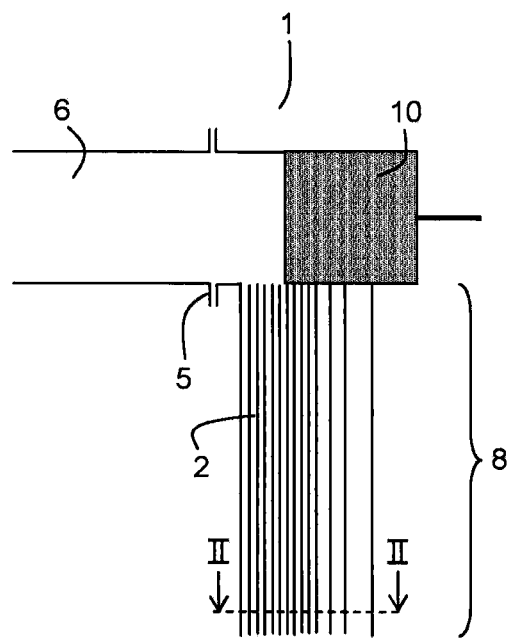
FIG. 4 schematically illustrates another embodiment of a flow rate control valve according to the invention, integrated to an injection pipe.
Figure 5:
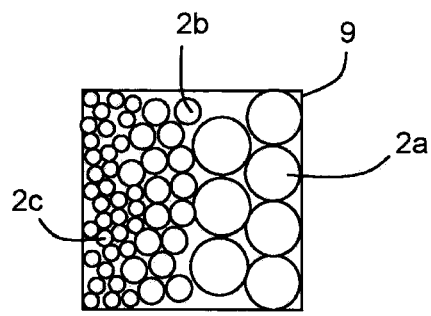
FIG. 5 corresponds to a cross-section taken along line II-II of the flow rate control valve of FIG. 4.

According to the alternative illustrated in FIGS. 4 and 5 (in which the reference numbers have the same meaning as above, unless indicated otherwise) the main axis of the flow rate control valve 8 is perpendicular to the main axis of the main portion 6 of the pipe, i.e. the pipe is L-shaped in the vicinity of the flow rate control valve 8. The sheath 9 has a cylindrical shape with a square cross-section. The tubes are distributed as strips according to their size. With this configuration it is possible to selectively obturate the tubes easily by using obturation means including a piston 10.

Figure 6:
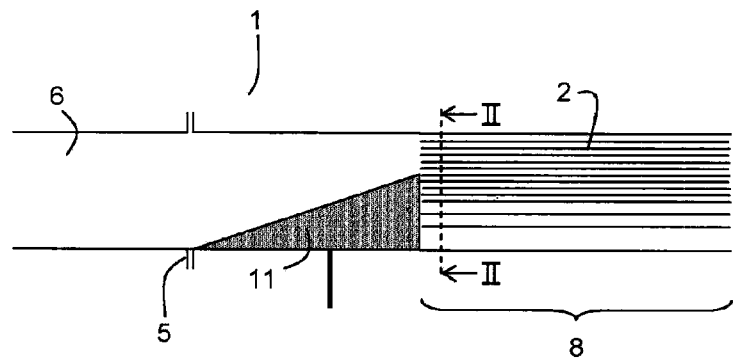
FIGS. 6 and 7 schematically illustrate another embodiment of a flow rate control valve according to the invention, integrated to an injection pipe.
Figure 7:
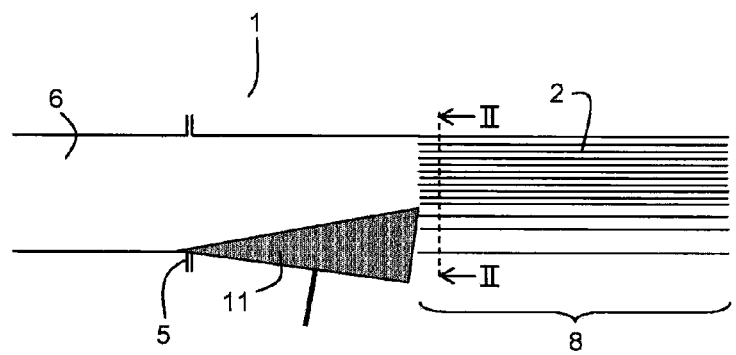

According to the alternative illustrated in FIGS. 6 and 7 (in which the reference numbers have the same meaning as above, unless indicated otherwise) the main axis of the flow rate control valve 8 is parallel to the main axis of the main portion 6 of the pipe. The sheath 9 has a cylindrical shape with a square cross-section (see again FIG. 5 corresponding to the cross-section taken along line II-II). The tubes are distributed as strips according to their size. With this configuration it is possible to selectively obturate the tubes easily by using an obturation means 11 with a pyramidal shape with a square base. With this configuration it is possible to minimize the contraction ratio at the inlet of the tubes.

Generally, the fluid transport tubes 2 all preferably have substantially the same length (dimension along their main axis, i.e. along the average direction of flow) for reasons of simplicity of design. A length from 1 cm to 10 m is advantageous, preferably from 10 cm to 3 m and more preferably from 30 cm to 1.5 m. It has been noticed by the inventors that the degradation of a solution of polymers essentially occurs only at the inlet of the tubes and not over the whole of their length. Therefore, by using a relatively substantial tube length, it is possible to obtain a significant pressure loss (at a given flow rate) without generating any significant degradation. However, it is also desired to avoid using excessively long tubes in order not to complicate the implementation of the invention and the manufacturing of the valve.

The bundle of fluid transport tubes 2 according to the invention may be manufactured by assembling (adhesive bonding, welding or other technique) of individual tubes or by piercing orifices in the plates followed by assembling (adhesive bonding, welding or other technique) of plates by aligning the orifices. It is advantageous to provide that the respective internal spaces of the fluid transport tubes 2 form an assembly as compact as possible, i.e. provide that the cross-section of the sheath 9 which is not available for letting through the fluid, be as reduced as possible. This allows limitation of the local contraction ratios and therefore limitation of the degradation of the fluid.

In this respect, in particular, it is useful that the overall contraction ratio of the valve (defined as being the ratio of the cross-section of the single tube of the main portion 6 over the sum of the plurality of cross-sections of the fluid transport tubes 2) is greater than 1 and is smaller than or equal to 5, preferably less than or equal to 3 and more preferably less than or equal to 1.5. The whole of the geometrical characteristics of the flow rate control valve 8, i.e. mainly the number, cross-section and length of the fluid transport tubes 2 are selected depending on the flow rate range and on the pressure loss range desired for the pipe.

The invention may be applied within the scope of an exploitation either located at sea (offshore) or not. The hydrocarbons are recovered by one or several production wells in a way known per se and may be subject to subsequent treatment known per se for example comprising solid removal, gas/liquid separation, water/oil separation, dehydration, upgrading, refining or other treatment. The use of the valve according to the invention is not limited to the field of assisted recovery of hydrocarbons. It may be used in all technical fields which require the movement of a pressurized fluid, said fluid being sensitive to mechanical degradations.

EXAMPLES

The following examples illustrate the invention without limiting it.

Example 1

Influence of the Internal Diameter of the Capillaries

Measurements of degradation of a polyacrylamide solution are conducted upon its passing into the capillary tubes. The polyacrylamide is the commercial hydrolyzed polyacrylamide 3630S provided by SNF. The injected solutions are prepared at a concentration of 800 ppm in synthetic brine at 35 g/L. The polyacrylamide solution is supplied by a tube with an internal diameter of 2 mm, and passes into a capillary tube with a smaller internal diameter, i.e. 0.75 mm, 0.5 mm, 0.25 mm or 0.18 mm. The length of each capillary is 30 cm.

Different flow rates are applied to the polyacrylamide solution in order to measure a pressure loss in the degrading tube comprised between 0 and 20 bars. For a given pressure loss, the flow rate is all the larger since the diameter of the degrading capillary is small. Thus, the flow rate is varied between 0 and 22 cc/min in the capillary of diameter 0.18 mm, between 0 and 4 cc/min in the capillary of diameter 0.25 mm, between 0 and 230 cc/min in the capillary of diameter 0.5 mm and between 0 and 400 cc/min in the capillary of diameter 0.7 mm.

For each experiment the pressure loss (pressure difference between the inlet and the outlet of a capillary) is measured as well as the viscosity of the solution at the inlet ($\eta_e$) and at the outlet ($\eta_s$) of the capillary. The degradation percentage D of the solution is inferred therefrom according to the following formula: $D=(\eta_e-\eta_s)/(\eta_e-\eta_{ref})\times 100$, wherein $\eta_{ref}$ represents the viscosity of water. As a comparison, the degradation obtained in a valve with a cage shape, marketed by Cameron Willis, is also measured on a real-size test bench under the flow rate conditions of an oil well (a flow rate varying between 30 and 200 m$^3$/h).

Figure 8:
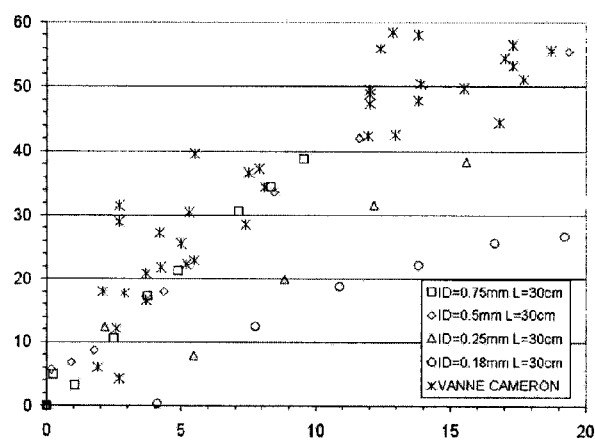
FIG. 8 provides the degradation percentage of a polymer solution (in ordinates) versus the pressure loss (in bars; 1 bar=0.1 MPa) for different internal capillary diameters (see Example 1).

The results are shown in FIG. 8. It is seen that for a given pressure loss, degradation decreases when the diameter of the capillary decreases. It is also seen that it is possible to obtain lower degradation than that obtained with the commercially available valve.

Example 2

Influence of the Length of the Capillaries

Figure 9:
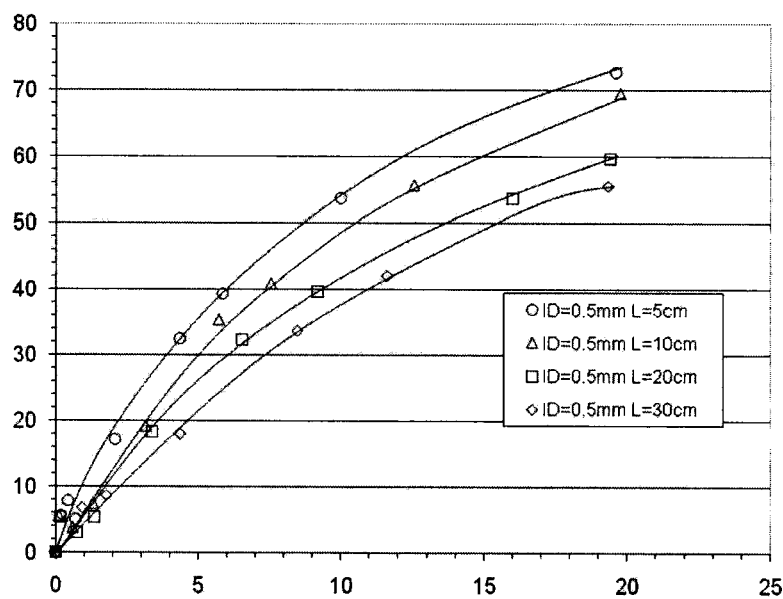
FIG. 9 provides the degradation percentage of a polymer solution (in ordinates) versus the pressure loss (in bars) for different capillary lengths (see Example 2).
Figure 10:
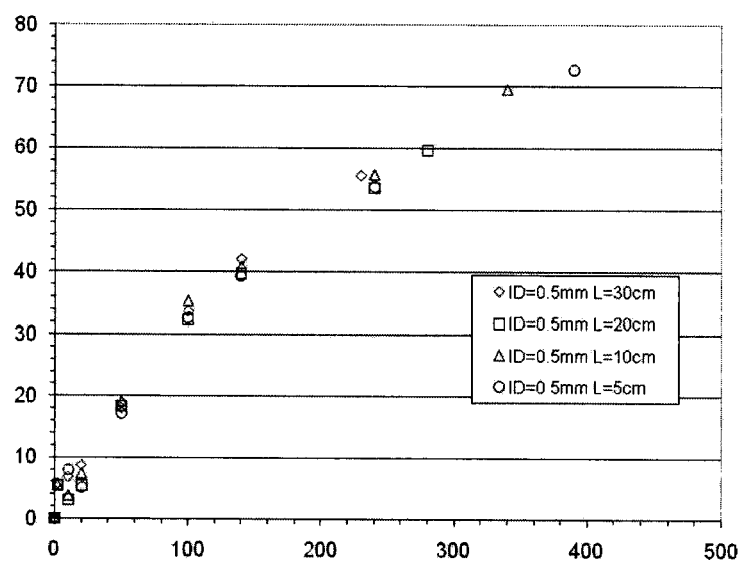
FIG. 10 provides the degradation percentage of a polymer solution (in ordinates) versus the flow rate (in mL/min) for different capillary lengths (see Example 2); and In FIGS. 8 to 10, "ID" means internal capillary diameter, and "L" means capillary length.

Measurements of degradation of a polyacrylamide solution are conducted in the same way as in Example 1, but by using capillary tubes of the same internal diameter (0.5 mm) and of different lengths. The results are shown in FIG. 9. It is seen that for a given pressure loss, the degradation decreases when the length of the capillary increases. Correlatively for a given flow rate, the degradation is identical regardless of the length of the capillary, as this may be seen in FIG. 10. This means that the degradation of the polymer only occurs at the inlet of the capillary tube, under the effect of the elongational velocity gradient. Consequently, by using a geometry limiting the local contraction ratios at the inlet of the capillary tubes as well as by using long capillaries, it is possible to reduce degradation of the polymer.

Example 3

Possible Geometries of the Flow Rate Control Valves According to the Invention

In a first scenario, it is desired to generate a pressure loss of 15 bars for a flow rate of 100 m$^3$/h with a polymer degradation of less than 36%, and with a valve of a length of 30 cm. According to Example 1 and FIG. 8, the polymer degradation is about 36%, at 15 bars of pressure loss, for a capillary with a length of 30 cm and with an internal diameter of 0.25 mm. The corresponding flow rate is 17 mL/min. Therefore the number of capillaries to be provided for accommodating the total flow rate is equal to 98,000.

The total diameter corresponding to the obtained bundle of capillaries is about 13.2 cm (for an external capillary diameter of 0.4 and a compactness of 0.9). The overall contraction ratio for this configuration is 2.8 (versus 64 in the configuration used in Example 1). Therefore, the polymer degradation obtained in this configuration is clearly less than 36%.

In a second scenario, it is desired to use capillaries with an internal diameter of 0.5 mm, in order to generate a pressure loss of 15 bars for a flow rate of 100 m³/h, with a polymer degradation of less than 20%. According to Example 2 and FIG. 8, the polymer degradation is about 20% in a capillary of internal diameter 0.5 mm, for a flow rate of 55 mL/min. Therefore, the number of capillaries to be provided for accommodating the total flow rate is equal to 30303. Still according to Example 2 and FIG. 10, it is determined that the capillary length required for obtaining a pressure loss of 15 bars is 150 cm.

The total diameter corresponding to the obtained bundle of capillaries is about 11.9 cm (for an external capillary diameter of 0.65 mm and a compactness of 0.9). The overall contraction ratio for this configuration is 1.9 (versus 16 in the configuration used in Example 1). Therefore, the obtained polymer degradation in this configuration is clearly less than 20%.

The invention claimed is:

1. A method for injecting a fluid in an underground formation, the method comprising:
   transporting a fluid in at least one injection pipe;
   using the injection pipe to inject the fluid into the underground formation, the injection pipe comprising a main portion including a single tube having a cross-section and a flow rate control valve including at least ten fluid transport tubes having a plurality of cross-sections, the plurality of cross-sections comprising at least a first cross-section and a second cross-section, the first cross-section being smaller or bigger than the second cross-section, the fluid transport tubes being arranged substantially in parallel, and a ratio of the cross-section of the single tube of the main portion over the sum of the plurality of cross-sections of the fluid transport tubes of the flow rate control valve being less than or equal to 5; and
   adjusting the flow rate of the fluid circulating in the injection pipe by moving at least one mobile portion moveable between a first position and a second position relative to the fluid transport tubes for selectively obturating the fluid transport tubes, the at least one mobile portion, in the first position, blocking flow of the fluid through all of the fluid transport tubes having the first cross-section while permitting flow of the fluid through all of the fluid transport tubes having the second cross-section.

2. The method according to claim 1, wherein at least one of the plurality of cross-sections, defined by at least one portion of one of the fluid transport tubes, is at least ten times smaller than the cross-section of the single tube of the main portion, wherein the cross-section of each of the fluid transport tubes is constant over a length of each of the fluid transport tubes, and wherein the fluid transport tubes are cylinders and each of the cylinders extends along a longitudinal axis, the longitudinal axes of the cylinders are parallel to each other, and/or the plurality of cross-sections of the fluid transport tubes are circular.

3. The method according to claim 1, further comprising distributing the fluid in a plurality of injection pipes by a pump, each injection pipe comprising the main portion including the single tube and the flow rate control valve including the at least ten fluid transport tubes arranged in parallel, the flow rate of the fluids circulating in each injection pipe being adjusted by distributing the fluid in all or part of the fluid transport tubes, and the fluid from the injection pipes being injected into the underground formation.

4. The method according to claim 1, wherein the fluid transport tubes do not all have identical cross-sections, and further comprising arranging the fluid transport tubes per groups of the fluid transport tubes with essentially identical cross-sections.

5. The method according to claim 1, wherein at least one of:
   the plurality of cross-sections, defined by at least one portion of one of the fluid transport tubes, ranges from 0.012 to 100 mm²;
   the plurality of cross-sections of at least one fluid transport tube ranges from 1 to 100 cm²; and/or
   the totality of the fluid transport tubes have a length ranging from 1 cm to 10 m.

6. The method according to claim 1, wherein the fluid is an aqueous solution of a polymer, and the molecular mass of the polymer is greater than $10^6$ Da.

7. The method according to claim 1, wherein the fluid is an aqueous solution of polyacrylamide.

8. The method according to claim 1, wherein the fluid is an emulsion.

9. The method according to claim 1, further comprising recovering hydrocarbons from the underground formation.

10. The method according to claim 1, further comprising recovering hydrocarbons from the underground formation and treating the recovered hydrocarbons.

11. A flow rate control valve intended to be connected to a single tube of a pipe having a cross-section, the valve comprising:
    at least ten fluid transport tubes arranged in parallel having a plurality of cross-sections, the plurality of cross-sections comprising at least a first cross-section and a second cross-section, the first cross-section being smaller or bigger than the second cross-section;
    a connector connecting to a main portion of the single tube of the pipe, located at one end of the fluid transport tubes and where a ratio of the cross-section of the single tube of the main portion over the sum of the plurality of cross-sections of the fluid transport tubes of the flow rate control valve is less than or equal to 5; and
    at least one mobile portion moveable between a first position and a second position relative to the fluid transport tubes for selectively obturating the fluid transport tubes, the at least one mobile portion, in the first position, blocking flow of the fluid through all of the fluid transport tubes having the first cross-section while permitting flow of the fluid through all of the fluid transport tubes having the second cross-section.

12. The flow rate control valve according to claim 11, wherein the obturation member is one of: a diaphragm, fins, a sleeve valve or a piston.

13. The flow rate control valve according to claim 11, wherein the fluid transport tubes do not all have identical cross-sections, but are arranged per groups of the fluid transport tubes of essentially identical cross-sections.

14. The flow rate control valve according to claim 11, wherein at least one of:
    the plurality of cross-sections, defined by at least one portion of one of the fluid transport tubes, ranges from 0.012 to 100 mm²;
    the plurality of cross-sections of at least one fluid transport tube ranges from 1 to 100 cm²; and/or
    the totality of the fluid transport tubes have a length ranging from 1 cm to 10 m.

15. An installation for transporting and injecting a fluid into an underground formation, the installation comprising:
    at least one injection pipe comprising a main portion which includes a single tube having a cross-section;

a flow rate control valve connected to the single tube of the main portion, the valve comprising at least ten substantially parallel fluid transport tubes having a plurality of cross-sections, the plurality of cross-sections comprising at least a first cross-section and a second cross-section, the first cross-section being smaller or bigger than the second cross-section, a ratio of the cross-section of the single tube over the sum of the plurality of cross-sections of the fluid transport tubes being less than or equal to 5; and at least one mobile portion moveable between a first position and a second position relative to the fluid transport tubes for selectively obturating the fluid transport tubes, the at least one mobile portion, in the first position, blocking flow of the fluid through all of the fluid transport tubes having the first cross-section while permitting flow of the fluid through all of the fluid transport tubes having the second cross-section.

16. The installation according to claim 15, wherein at least one of the plurality of cross-sections, defined by at least one portion of one of the fluid transport tubes, is at least ten times smaller than the cross-section of the single tube of the main portion, wherein the cross-section of each of the fluid transport tubes is constant over a length of each of the fluid transport tubes, and wherein the fluid transport tubes are cylinders and each of the cylinders extends along a longitudinal axis, the longitudinal axes of the cylinders are parallel to each other, and/or the plurality of cross-sections of the fluid transport tubes are circular.

17. The installation according to claim 15, further comprising a plurality of injection pipes connected to a pump, each injection pipe comprises a main portion including the single tube and the flow rate control valve.

18. The installation according to claim 15, wherein the at least one mobile portion blocks flow of the fluid through all of the fluid transport tubes in the second position.

* * * * *